Oct. 17, 1933.  J. J. BARRETT  1,930,578
ELECTROLYTIC CONDENSER
Filed May 28, 1932
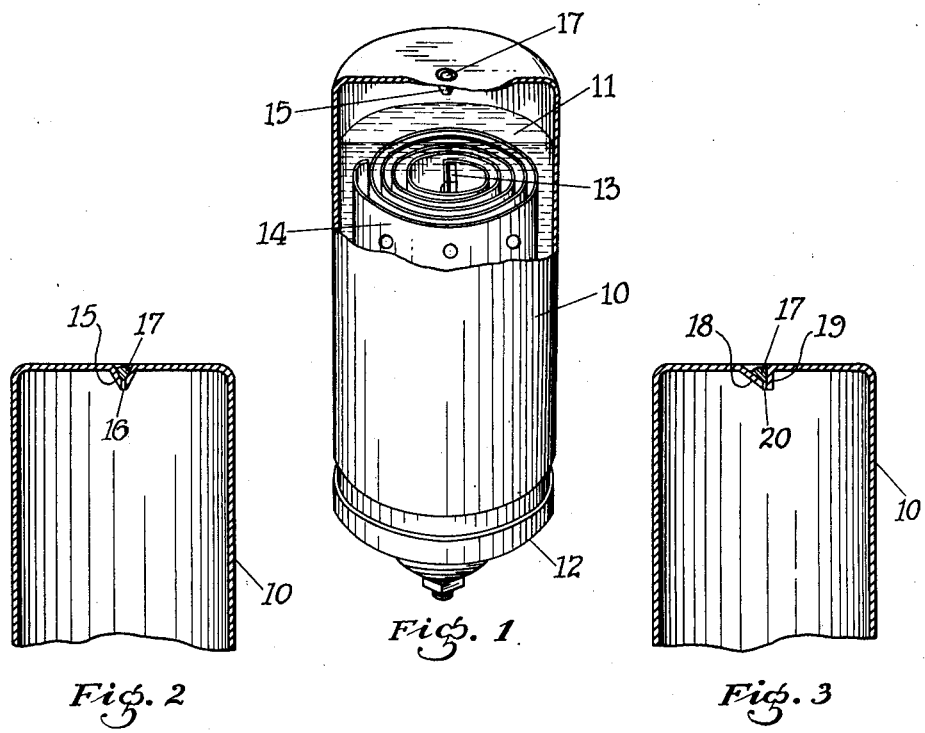
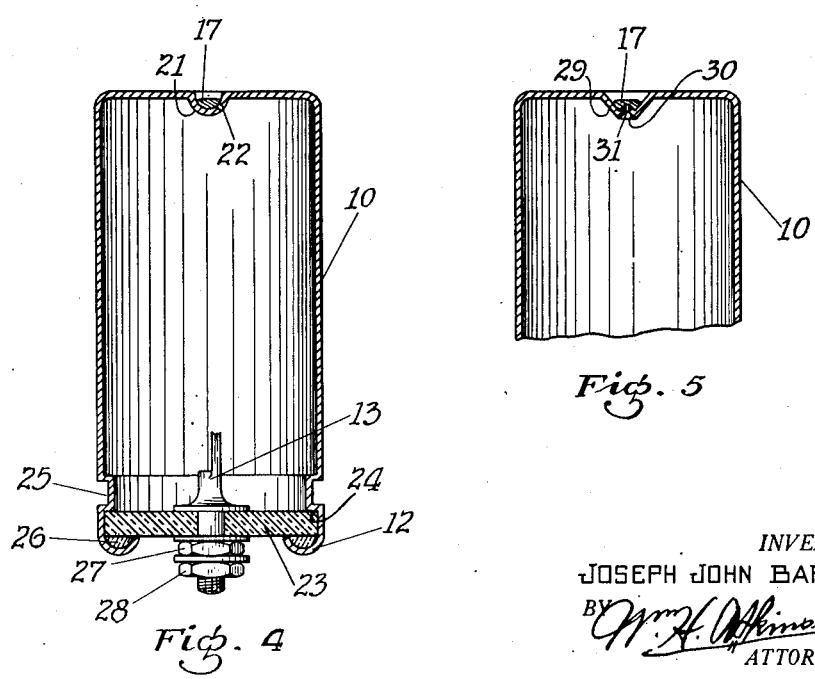
INVENTOR.
JOSEPH JOHN BARRETT.
BY
ATTORNEY.

Patented Oct. 17, 1933

1,930,578

UNITED STATES PATENT OFFICE 1,930,578

ELECTROLYTIC CONDENSER

Joseph John Barrett, Fort Wayne, Ind., assignor to The Magnavox Company, Fort Wayne, Ind., a corporation of Arizona Application May 28, 1932. Serial No. 614,149

9 Claims. (Cl. 175—315)

My present invention relates to electrolytic apparatus and more particularly to electrolytic condensers of the type having means for relieving any excessive pressure created within the condensers because of a heating thereof due to abnormal operating conditions.

An object of my invention is to provide a new, novel, inexpensive and effective means for sealing an electrolyte container to prevent contamination of the electrolyte by the entrance of foreign matter, and which will permit the escape of gas from within the container to thus prevent an explosion of the container should the electrolyte be subjected to abnormal operating conditions.

Another object of my invention is to provide a new and novel pressure relief means for electrolyte confining containers which will become progressively more subject to operation as the temperature of the electrolyte increases.

A further object of my invention is to provide a fusible pressure relief means for an electrolyte container which will remain inoperative under all normal operating temperatures and become operative when a predetermined higher temperature is reached.

Another object of my invention is to provide a pressure relief means for an electrolytic condenser of the type wherein the electrolyte container forms one of the electrodes of the condenser, which means will become operative when the temperature of the condenser approaches a predetermined temperature and be self restoring when the temperature of the condenser returns to a normal value.

Condensers of the type with which my present invention is primarily concerned are usually provided with an outer seamless copper container that forms one of the electrodes of the condenser. This container is sealed at its open end with an insulating cover upon which a second electrode of the condenser is mounted. This second electrode is spaced from the walls of the container and is adapted to be completely covered by a suitable electrolyte.

In using electrolytic condensers in radio sets and other like portable and semi-portable apparatus, it is necessary that the electrolyte of the condensers be sealed in, so that it can not spill or leak out and thus damage surrounding apparatus. Under abnormal operating conditions, however, the electrolyte is subjected to heating which at times causes it to evolve gas and in extreme cases even boil, and therefore it is also necessary that a pressure relief means be provided that will prevent an explosion of the condenser by pressure established within the container when an abnormal heating of the electrolyte occurs.

An expedient which is resorted to at the present time for relieving any pressure existing within the condenser consists in providing an opening in the wall of the condenser over which a suitable rubber nipple or valve is disposed.

In this particular device the rubber nipple has a very small cold pricked aperture in the center that will remain closed under normal conditions but which will open when an excessive pressure exists within the condenser.

This type of relief means, in addition to being expensive and complicated, is also open to the objection that the rubber nipple or valve in time deteriorates and becomes useless to prevent a spilling of the electrolyte and the entrance of foreign matter into the container.

Another difficulty which has been encountered in connection with the use of these rubber nipples is that the nipple very often fails to open until it has been expanded like a small balloon. In this latter event, when the nipple finally opens, the elasticity thereof will cause the electrolyte or an electrolyte vapor to be squirted out upon the surrounding apparatus. Because of this latter characteristic of the rubber nipple, it is now the practice to provide a perforated metal cap over the nipple so as to protect it against damage and also prevent a spraying of the electrolyte as suggested above. This cap adds further to the cost of the condenser.

In each of the prior art devices, with which I am familiar, the pressure relief means is designed to operate in response to the pressure existing within the electrolyte container, and as a result, when such a device operates there will be a squirting of the electrolyte vapor as the relief means opens.

In carrying out my invention I have taken into consideration the fact that no pressure can be established within the electrolyte container without a heating thereof, and with this fact in mind, I have provided a pressure relief means for the condenser which will become operative at a predetermined temperature of the electrolyte, and preferably at a temperature below that at which a dangerous pressure will be established within the condenser. It may therefore be said that another object of my invention is to provide a pressure relief means for electrolyte containing receptacles which is responsive to the temperature and/or the pressure existing within the condenser.

In the operation of my improved relief means the fusible metal will fuse or melt to permit the escape of heated air or vapor before any substantial pressure is built up within the container. In fact, by using a sealing material having a low fusion temperature, it is possible to prevent the establishing of a pressure greater than that required to bubble through the sealing material when in its melted condition.

For a better understanding of my invention reference should be had to the accompanying drawing wherein I have shown by way of illustration and not of limitation preferred embodiments thereof.

In the drawing:

Figure 1 is a perspective view of a condenser with a portion broken away to show the interior thereof, Figure 2 is a fragmentary sectional view showing one form of my improved pressure relief means, and Figures 3, 4 and 5 are sectional views showing modified forms of my invention.

In the drawing, wherein I have illustrated a commercial form of electrolytic condenser, 10 designates a seamless copper container which is adapted to retain a liquid or semi-liquid electrolyte 11. The bottom end of the container 10 is rolled over a suitable insulating closure member at the point 12, as will be hereinafter pointed out, to prevent the escape of the electrolyte 11 at this point. Mounted centrally in this closure member there is provided a vertically extending stud 13 to which a spirally formed aluminum anode 14 is attached. The anode 14 projects upwardly into the container 10 to a point below the upper level of the electrolyte 11, and immediately above the electrolyte 11 the container 10 is provided with an inwardly projecting protuberance or depression 15 which, as will be seen by referring to Figure 2 of the drawing, has a small perforation 16 through which air, gas or, in extreme cases, liquid vapor may escape, should a pressure be established within the condenser by an overheating thereof. Disposed within the depression 15 and acting as a seal for the opening 16, I show a quantity of fusible material 17. This material 17 may be a soft solder, wood's metal, pitch or in fact any other material which will remain hard and seal the opening 16 at the normal operating temperatures of the condenser.

In Figure 2 the depression or protuberance 15 is formed by simply pressing the end of the container 10 inwardly in the form of a cone. At the apex of this cone a small aperture 16 is drilled or punched. In this particular embodiment, with the fusible material 17 disposed centrally over the aperture 16, it is conceivable that in an extreme case, for instance where the condenser is rapidly overheated, that a pressure might be built up to such a value that when the fusible material 17 becomes melted it will be blown completely out of the depression or pocket 15. In some instances this would be objectionable as it would leave the condenser unsealed, but where the condenser is subjected to a sudden and extreme overheating, the overheating will in general be due to a physical defect within the condenser which will render it unsuited for further use and therefore a resealing of the condenser, as is to be hereinafter pointed out, will be of no importance.

In some uses, however, it is possible that the condenser might be periodically subjected to a slight overheating where it would be desirable to relieve any pressure existing within the casing without permanently opening the vent. In such a condenser I may construct my improved vent so that the air or gas under pressure will be directed out through the fusible material 17 in such a direction that no substantial amount of the material will be dislodged from the pocket or depression in which it is disposed.

A depression or pocket of this latter type is illustrated in Figure 3. In this figure of the drawing the depression or pocket, designated by the numeral 18, is shown as having a straight side 19 so that the depression is of a semi-conical shape. This pocket has an aperture 20 disposed at the apex of the conical portion so that any air or gas which is expelled will be directed along the straight side 19 of the pocket, where it can not operate to completely dislodge the fusible material 17. With this arrangement the fusible material 17 will be forced outwardly along the conical portion of the pocket as the air or gas is being exhausted from the container 10, and when the exhaust of air or gas ceases the material 17, being still in a melted condition, will flow downward, and again seal the aperture 20 and permit the condenser to be used further without fear of the electrolyte becoming contaminated.

Another structural embodiment of this principle is illustrated in Figure 4 wherein a depression or pocket, designated by the numeral 21, is shown as semi-spherical and as having an aperture 22 formed in one side thereof below the normal level of the fusible material 17. When air or gas under pressure is exhausted through the aperture 22, it will have a tendency to bubble up through the melted fusible material 17, and as a result the latter material will not be dislodged from the pocket 21, but will settle back and seal the aperture 22 after the expanded air or gas is exhausted from the condenser.

This figure of the drawing also very clearly illustrates the manner of closing and sealing the container 10 at its bottom end. As here illustrated the stud 13, which carries the inner electrode or anode 14, is shown as mounted centrally upon an insulating disk 23. The disk 23 is of a diameter corresponding to the inner diameter of the container 10 and is disposed against a shoulder 24 formed by spinning an annular depression 25 about the open end of the container 10. After the disk 23 with the electrode 14 and the electrolyte have been placed within the container 10 a comparatively soft rubber ring 26 is placed thereover and the end of the container is then spun over this ring 26, as illustrated at point 12 in this figure of the drawing. The stud 13 is secured upon the disk 23 by a nut 27 and an additional nut 28, in conjunction with a suitable terminal, serves to form an attaching means for a conductor of the electrical circuit in which the condenser is to be used. The other conductor of the circuit is then connected directly to the copper container 10.

In Figure 5, I have shown a further modification of my invention, wherein the pocket or receptacle of the pressure relief means is so formed that it is possible to dispose the fusible material 17 over the aperture and provide a film of the fusible material of any desired thickness over the aperture. In this embodiment the depression has an outer conical portion 29, in the center of which there is provided a second and outwardly projecting or reentrant conical portion 30, through the center of which an aperture 31 is formed. With this type of depression or pocket for the fusible material 17, it will be seen that the thickness or amount of the fusible material 17 disposed immediately over the aperture 31 may be determined by the amount of fusible material placed in the pocket formed by the conical portion 29.

While I have specifically described the use of a fusible material as a sealing means for the aperture, I should like to point out that, where the pocket or depression is properly located, satisfactory results may be obtained by depositing any suitable fluid substance in the pocket over the vent aperture. Such a substance would be one having a surface tension sufficient to prevent its flowing into the condenser through the small aperture over which it is disposed. It is believed that the operation of my improved pressure relief means will be fully understood from the above description.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. In an electrolytic condenser, the combination of a container forming one of the electrodes of the condenser, a second electrode disposed within said container, an electrolyte within said container, and means comprising a small aperture in the wall of said container having a metal of low melting point disposed thereover for relieving any excessive pressure created within said condenser by an overheating of said electrolyte.

2. In an electrolytic condenser, the combination of a container forming one of the electrodes of the condenser, a second electrode disposed within said container, an electrolyte within said container, and means for relieving any pressure created within said container by a heating of said electrolyte which comprises an inwardly projecting protuberance having a small aperture therein over which a fusible metal is disposed.

3. An electrolyte container for electrolytic apparatus, comprising an electrolyte enclosing container having a small aperture formed therein for the escape of gas and/or vapor caused by an overheating of the apparatus, and a fusible metal disposed over said aperture adapted to remain solid and seal the container at all normal operating temperatures and fuse to permit the escape of gas when an abnormal operating temperature is reached.

4. In an electrolytic condenser, the combination of a container forming one of the electrodes of the condenser, a second electrode disposed within said container, an electrolyte within said container, a normally closed vent for said condenser comprising a pocket having a small aperture formed in the outer surface of said container, and a fusible metal in said pocket disposed over said aperture to seal the container at all normal operating temperatures, said pocket being so shaped and the amount of fusible metal therein being such that after fusing to permit the escape of gas the metal will flow back and reseal the container when a normal operating temperature exists.

5. A pressure relief means for electrolytic condensers of the type having a container in which an electrolyte is hermetically sealed, which comprises an inwardly projecting recess formed in the wall of the container having a small aperture therein, and a globule of fusible metal disposed in said recess and over said aperture, said fusible metal having a melting point above the normal operating temperature of the condenser.

6. An electrolyte container for electrolytic apparatus, comprising a metallic electrolyte enclosing container having a small recessed aperture formed therein for the escape of gas and/or vapor caused by overheating of the apparatus, and a fusible metal disposed in said recess and over said aperture adapted to seal the container at all normal operating temperatures of the apparatus.

7. In an electrolytic condenser, the combination of a metallic container adapted to enclose an electrolyte, said container having a depression formed in a wall thereof with a small aperture in said depression, and a globule of fusible metal in said depression and disposed over said aperture.

8. An electrolyte enclosing electrode for electrolytic condensers, comprising a cylindrical container having a closed end in which there is formed an inwardly projecting protuberance having a small aperture which communicates with the interior of the container, and a solidified fusible metal disposed in said protuberance and over said aperture.

9. An electrolyte enclosing electrode for electrolytic condensers, comprising a cylindrical container having a closed end in which there is formed an inwardly projecting conical depression having a reentrant conical portion with a small aperture at its apex, and a fusible metal disposed in said conical depression and over the aperture at the apex of said reentrant conical portion.

JOSEPH JOHN BARRETT.